Aug. 20, 1935.   H. A. DOUGLAS   2,011,677
LIGHT CONTROL
Filed Nov. 2, 1933
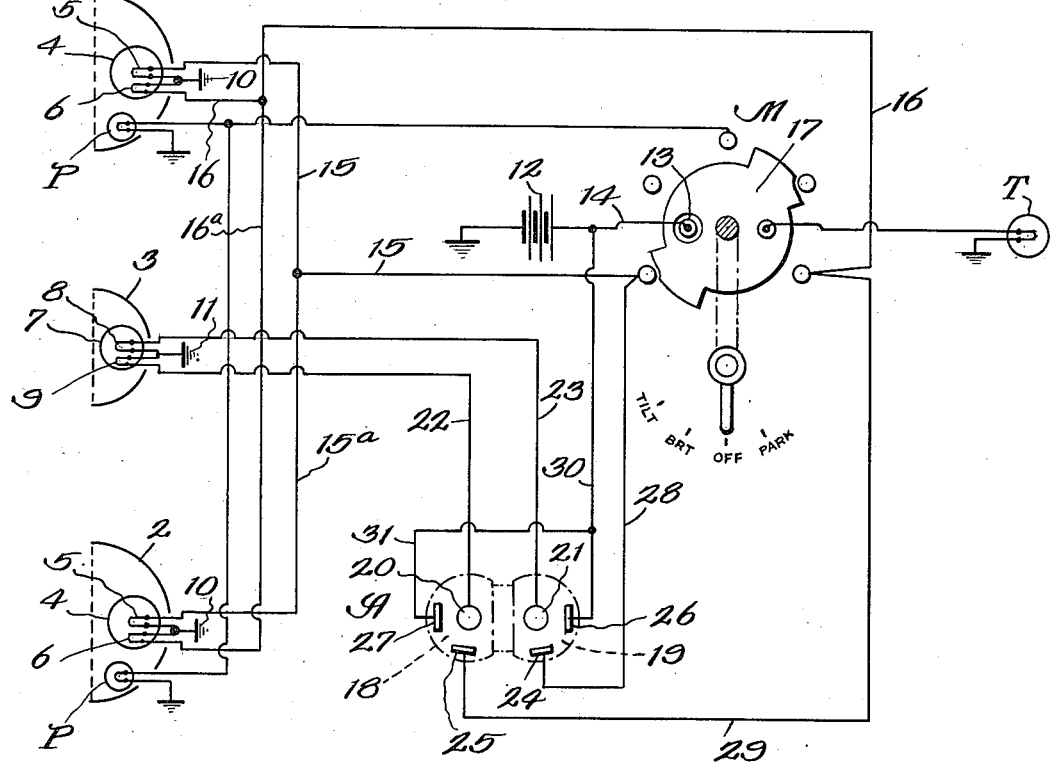
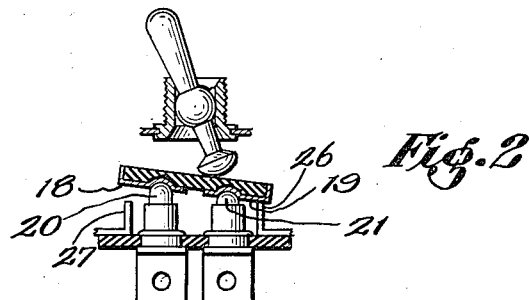
INVENTOR
HARRY A. DOUGLAS
BY
ATTY.

Patented Aug. 20, 1935

2,011,677

UNITED STATES PATENT OFFICE 2,011,677

LIGHT CONTROL

Harry A. Douglas, Bronson, Mich.

Application November 2, 1933, Serial No. 696,443

6 Claims. (Cl. 171—97)

This invention relates to improvements in lighting systems and more particularly to the lighting systems of automotive vehicles including a "driving" or auxiliary "head" light and a control therefor, and is a continuing application of this applicant's prior copending application, Serial No. 657,552, filed February 20, 1933.

It is an object of this invention to include in the lighting system of an automotive vehicle having a suitable switching mechanism for controlling the operation of the "tail", "parking", "head" and "driving" or auxiliary "head" lights included in the system with auxiliary switching mechanism for causing the "driving" light to be controlled either by the main switching mechanism or, independently of such main switching mechanism, by the auxiliary switching mechanism itself.

With these and other objects in view, reference is made to the accompanying sheet of drawings which illustrates a preferred form of this invention with the understanding minor detail changes may be made without departing from the scope thereof.

Figs. 1 and 2 of the drawing illustrate diagrammatically the circuits and means for connecting the various elements of the lighting system of an automotive vehicle to said circuits in accordance with this invention.

The illustrative circuit diagram shows a conventional arrangement of two automobile headlights 1 and 2 and an auxiliary or supplemental head light, some times called a driving light 3. In this instance, the headlights 1 and 2 carry a single incandescent electric bulb 4 provided with a "bright" filament 5, which may be located in the focus of the reflector of the headlight, and a "tilt" filament 6, which may be located slightly above the focus of the reflector so as when energized to direct its rays downward upon the road. Similarly, the auxiliary light 3 may also have a single incandescent bulb 7 carrying a "bright" filament 8 and a "tilt" filament 9. The filaments 5 and 6 may be connected to a common ground 10 and the filaments 8 and 9 to a common ground 11, which ground may be the metallic frame of the vehicle to provide a return path for the electric current to the grounded battery 12, all in accordance with conventional automotive lighting practice, which practice includes the provision of a tail light carrying an incandescent bulb T and usually parking lights carrying incandescent bulbs P in which the filaments of the respective bulbs may be connected to a common ground in the manner described in connection with the head and auxiliary light bulbs.

The "bright" filaments 5 and "tilt" filaments 6 of the headlights may be controlled by any suitable switching mechanism, but preferably of the type disclosed in this applicant's application executed concurrently herewith, illustrated diagrammatically at M, which is in series with the battery 12 by means of the contact 13 and insulated conductor 14 and which may be connected in series therewith by the conductors 15 and 16, leading to the "bright" and "tilt" filaments, respectively, of the headlight 1, the conductors 15a and 16a being branched from the conductors 15 and 16, respectively, to the other headlight 2. By means of the movable contact 17, either the "bright" filaments of both headlights or the "tilt" filaments of both headlights may be energized, or all of these filaments may have the circuit discontinued in the "off" position of the switching mechanism M. As shown in the diagram, the movable contact 17 is in the "off" position and a movement to the position indicated "Brt" will energize the "bright" filaments of the headlights 1 and 2 and a continued movement to the position indicated "tilt" will obviously deenergize the "bright" filaments and energize the "tilt" filaments of said headlights.

In accordance with this invention, an auxiliary switching mechanism A is provided for causing the auxiliary light 3 to be controlled either by the switching mechanism M or, independently of the switching mechanism M, by the switch A itself. For convenience the switching mechanism M is usually mounted on the steering column (not shown), and the auxiliary switch A may be conveniently mounted on the instrument panel (not shown).

The auxiliary switch for independently controlling the driving light may be any suitable switching mechanism, but preferably of the type disclosed in this applicant's said prior copending application, Serial No. 657,552, filed February 20, 1933, and indicated diagrammatically at A. As diagrammatically shown the auxiliary switch A includes two separated circuit continuing bridges or contact plates 18 and 19 mounted to maintain engagement with contacts 20 and 21, contact 20 being connected by conductor 22 to the "tilt" filament and contact 20 being connected by conductor 23 to the "bright" filament of the lamp 7 of the driving light 3. The switch A also includes means of connecting and disconnecting the "bright" filament conductor 23 of the auxiliary light to the conductor 15 from the main switch M to the "bright" filaments of the headlights 1 and 2 and means of connecting and disconnecting the "tilt" filament conductor 22 of the auxiliary light to the conductor 16 leading from the switch M to the "tilt" filaments of the headlights 1 and 2 as well as connecting either of the conductors 22 and 23 of the driving lights directly to the battery 12 when the switch disconnects both filaments of the headlights 1 and 2. An indicated in the diagram, the above described circuits are established or disconnected by the provision of contacts 24, 25, 26 and 27 in the switch A and connect contact 24 by conductor 28 to conductor 15, contact 25 by conductor 29 to conductor 16, contact 26 by conductor 30 to the battery 12, and contact 27 by conductor 31 to the battery 12, either directly or by being connected to conductor 30, as shown. By proper manipulation of the switch A, both bridges 18 and 19 may be caused to continue or discontinue the circuits from contacts 20 and 21 to contacts 25 and 24 and when the circuits are so continued the driving light 3 is controlled simultaneously with the headlights 1 and 2 by the switch M. When such circuits are discontinued through switch A the bridge 19 may be caused to continue the circuit from contact 21 to contact 26 or the bridge 18 may be caused to continue the circuit from contact 20 to the contact 27 while the bridge 19 discontinues the circuit therethrough and vice versa. When the circuit is continued through switch A from contact 21 to contact 26, a circuit is continued from the battery 12 through conductors 30 and 23 to the "bright" filament of the auxiliary light 3 and all other circuits are discontinued through switch A. Likewise, when the circuit is continued from contact 20 to contact 27, through bridge 18, the circuit is continued from the battery 12 through connectors 30, 31 and 22 to the "tilt" filament of the auxiliary light 3, and all other circuits are discontinued through the switch A.

From the above it is readily seen, that in accordance with this invention, the provisions of the auxiliary switch A in the circuit between the main switch A' and the auxiliary light 3, said auxiliary light may be controlled to operate in unison with the headlights 1 and 2 through the main switch M or controlled by switch A to operate independently of the main switch A, as when the main switch M is in the "off" position.

It is obvious that, if desired, the conductor 22 from the "tilt" filament 9 may be connected to contact 20 with the conductor 23 from the "bright" filament 8 connected to the contact 21, whereby when the switch A continues both circuits through contacts 20 and 25 and 21 and 24, and the circuits controlled by the manual switch M, then when the filaments of the headlights are "bright" the filament of the light 3 will be "tilt" and vice versa.

What I claim is:

1. A control for an electric lighting system including a source of electricity, a plurality of electric lamps, a switching mechanism providing means for selectively establishing a circuit from the source to selected lamps to the exclusion of others, an additional switching mechanism providing means for selectively establishing circuits to the excluded lamps, and means included in said additional switching means for establishing independent of the first switching means circuits from the source to lamps excluded by said first means.

2. A control for the electric lighting system of an automotive vehicle including a tail light and a pair of headlights each having bright and dim lamps, a source of electricity, a switching mechanism providing means for selectively establishing a circuit from the source to the tail light and to the lamps of each headlight, an additional driving light including bright and dim lamps, an additional switching mechanism providing means for selectively controlling the establishment of a circuit from the selected circuit established by the first switching means to the corresponding lamp of the driving light, and means included in said additional switching mechanism for selectively establishing circuits from the source to the driving light lamps independently of the circuit established by the first switching means to the headlights.

3. A control for the electric lighting system of an automotive vehicle including headlights each having bright and dim filaments, a source of electricity, a switching mechanism for selectively establishing a circuit through the respective bright or dim filaments to the source, an additional light having bright and dim filaments, an additional switching mechanism including an independent connection to the source and including means to continue and discontinue the circuits through the respective filaments of all of the lights to be selectively controlled in unison by the first switching mechanism and additional means to selectively establish circuits through the filaments of the additional light to the source independent of the headlight.

4. A control for the electric lighting system of an automotive vehicle including headlights each having bright and dim filaments, a source of electricity, a switching mechanism for selectively establishing a circuit through the respective bright or dim filaments to the source, an additonal light having bright and dim filaments, an additional switching mechanism having an independent connection to the source adapted to selectively energize the respective filaments in unison by operation of the first switching mechanism or to selectively energize the filament of the additional light independent of the headlights.

5. A control for the electric lighting system of an automotive vehicle including headlights each having bright and dim filaments, a source of electricity, a switching mechanism for selectively establishing a circuit through the respective bright or dim filaments to the source, an additional light having bright and dim filaments, an additional switching mechanism adapted to selectively energize the respective filaments in unison by operation of the first switching mechanism or to selectively energize the filament of the additional light independent of the first switching mechanism by establishing circuits through the selected filament of the additional light to the source independent of connections to the first switching mechanism.

6. A control for the electric lighting system of an automotive vehicle including a pair of headlights each having bright and dim lamps, a source of electricity, a manually operated switching mechanism providing means for selectively establishing a circuit from the source to the tail light and to the lamps of each headlight, an additional driving light including bright and dim lamps, an additional switching mechanism providing means for selectively controlling the establishment of a circuit from the selected circuit established by the manual switching means to the corresponding lamp of the driving light, and means included in said additional switching mechanism for selectively establishing circuits from the source to the driving light lamps independently of the circuit established by the manual switching means to the headlights.

HARRY A. DOUGLAS.